United States Patent
Lau et al.

(10) Patent No.: US 10,075,587 B2
(45) Date of Patent: Sep. 11, 2018

(54) SELECTIVE DELIVERY OF MESSAGES TO USER DEVICES THAT SHARE A TELEPHONE NUMBER

(71) Applicant: Verizon Patent and Licensing Inc., Arlington, VA (US)

(72) Inventors: Priscilla Lau, Fremont, CA (US); Kevin Lim, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 547 days.

(21) Appl. No.: 14/714,641

(22) Filed: May 18, 2015

(65) Prior Publication Data
US 2016/0344866 A1   Nov. 24, 2016

(51) Int. Cl.
| G06F 15/16 | (2006.01) |
| H04M 3/42 | (2006.01) |
| H04W 4/12 | (2009.01) |
| H04L 12/58 | (2006.01) |
| H04L 29/12 | (2006.01) |

(52) U.S. Cl.
CPC ........ *H04M 3/42263* (2013.01); *H04L 51/14* (2013.01); *H04L 51/24* (2013.01); *H04L 61/106* (2013.01); *H04L 61/605* (2013.01); *H04W 4/12* (2013.01); *H04L 61/1588* (2013.01)

(58) Field of Classification Search
CPC . H04L 61/605; H04L 61/1588; H04L 61/106; H04L 51/24; H04L 51/14; H04W 4/12; H04M 3/42263
USPC .......................................... 709/223; 455/445
See application file for complete search history.

(56) References Cited

U.S. PATENT DOCUMENTS

| 7,616,647 | B1* | 11/2009 | Madhavarapu | H04W 8/26 370/352 |
| 8,175,236 | B2* | 5/2012 | Pandey | G06Q 30/0267 370/329 |
| 8,948,752 | B2* | 2/2015 | Siegel | H04W 12/06 455/435.1 |
| 9,026,675 | B2* | 5/2015 | Merino Vazquez | H04L 29/12188 709/245 |
| 9,191,804 | B1* | 11/2015 | Paczkowski | H04W 8/18 |
| 9,232,386 | B2* | 1/2016 | Mannepally | H04W 8/06 |
| 9,246,706 | B2* | 1/2016 | Mutikainen | H04L 12/581 |
| 9,648,050 | B2* | 5/2017 | Le Rouzic | H04L 65/1016 |
| 2006/0206504 | A1* | 9/2006 | Cai | H04M 7/121 |

(Continued)

*Primary Examiner* — Larry Donaghue
*Assistant Examiner* — Binod J Kunwar

(57) ABSTRACT

A device may determine that delivery of a message, to a destination identified by a telephone number shared by multiple user devices, has failed. The device may receive a unique identifier from a message delivery device associated with delivering the message. The unique identifier may correspond to a user device of the multiple user devices, and may be different from the telephone number. The device may determine whether the unique identifier indicates that the user device is able to receive the message, and may selectively provide the message to the message delivery device. The message may be provided to the message delivery device for delivery to the user device when the unique identifier indicates that the user device is able to receive the message. The message may not be provided to the message delivery device when the unique identifier indicates that the user device is unable to receive the message.

20 Claims, 10 Drawing Sheets

(56) References Cited

U.S. PATENT DOCUMENTS

| | | | |
|---|---|---|---|
| 2009/0191871 A1* | 7/2009 | Siegel | H04W 12/06 455/435.1 |
| 2009/0227246 A1* | 9/2009 | Guedalia | H04L 61/1594 455/419 |
| 2011/0134843 A1* | 6/2011 | Noldus | H04W 60/005 370/328 |
| 2011/0159889 A1* | 6/2011 | Kojo | H04M 3/229 455/456.1 |
| 2011/0264747 A1* | 10/2011 | Mutikainen | H04L 12/581 709/206 |
| 2012/0036270 A1* | 2/2012 | Escribano Bullon | H04L 65/1016 709/227 |
| 2012/0039312 A1* | 2/2012 | Narkar | H04W 8/00 370/338 |
| 2012/0131202 A1* | 5/2012 | Qiu | H04L 65/1016 709/227 |
| 2012/0243471 A1* | 9/2012 | Boulos | H04W 76/16 370/328 |
| 2014/0280562 A1* | 9/2014 | Shields | H04L 65/403 709/204 |
| 2015/0334135 A1* | 11/2015 | Le Rouzic | H04L 65/1016 455/445 |
| 2016/0135139 A1* | 5/2016 | Jahangir | H04L 65/1016 455/435.1 |

\* cited by examiner

US 10,075,587 B2

SELECTIVE DELIVERY OF MESSAGES TO USER DEVICES THAT SHARE A TELEPHONE NUMBER

BACKGROUND

A telephone number, such as a mobile directory number (MDN), may be shared by multiple user devices. For example, a first user device, such as a mobile phone, may share a telephone number with a second user device, such as a tablet computer. In this way, a user may use either device (e.g., the mobile phone or the tablet computer) to make and receive calls using a single telephone number.

DETAILED DESCRIPTION OF PREFERRED EMBODIMENTS

The following detailed description of example implementations refers to the accompanying drawings. The same reference numbers in different drawings may identify the same or similar elements.

Multiple user devices may share a single telephone number, such as a mobile directory number (MDN). This may allow a user to use more than one user device to make and receive calls using the same telephone number. However, some types of user devices may not be able to receive particular types of messages, such as short message service (SMS) messages, multimedia messaging service (MMS) messages, or the like. For example, a mobile phone may be able to receive an SMS message, but a tablet computer or a desktop computer may not be able to receive an SMS message (e.g., due to a user device capability, a network configuration, etc.). As another example, a network administrator may want a particular type of message to be deliverable to a first type of user device, but not deliverable to a second type of user device.

User devices that share a single telephone number may include a primary user device able to receive a particular type of message and a secondary user device unable to receive the particular type of message. A home subscriber server (HSS), responsible for notifying a messaging device of user device registration, may not be able to differentiate between primary user devices and secondary user devices. Thus, the messaging device, responsible for storage and/or delivery of messages, may not be able to determine whether to deliver a message to a user device that shares a telephone number with another user device.

As an example, a secondary user device may register with the HSS using a shared telephone number, which may trigger the messaging device to provide the message for delivery to the secondary user device. Because the secondary user device is not able to receive the message, delivery of the message may fail. At a later time, a primary user device, that shares the telephone number with the secondary user device, may register with the HSS using the shared telephone number. This registration may not trigger message delivery because the telephone number is already registered with the HSS and the HSS cannot differentiate between primary user devices and secondary user devices. Because of this, the message may never be delivered to the primary user device, or may not be delivered to the primary user device in a timely manner. Implementations described herein provide a mechanism for the messaging device to differentiate between primary user devices and secondary user devices, and to selectively provide messages for delivery to primary user devices in a timely manner.

Figure 1A:
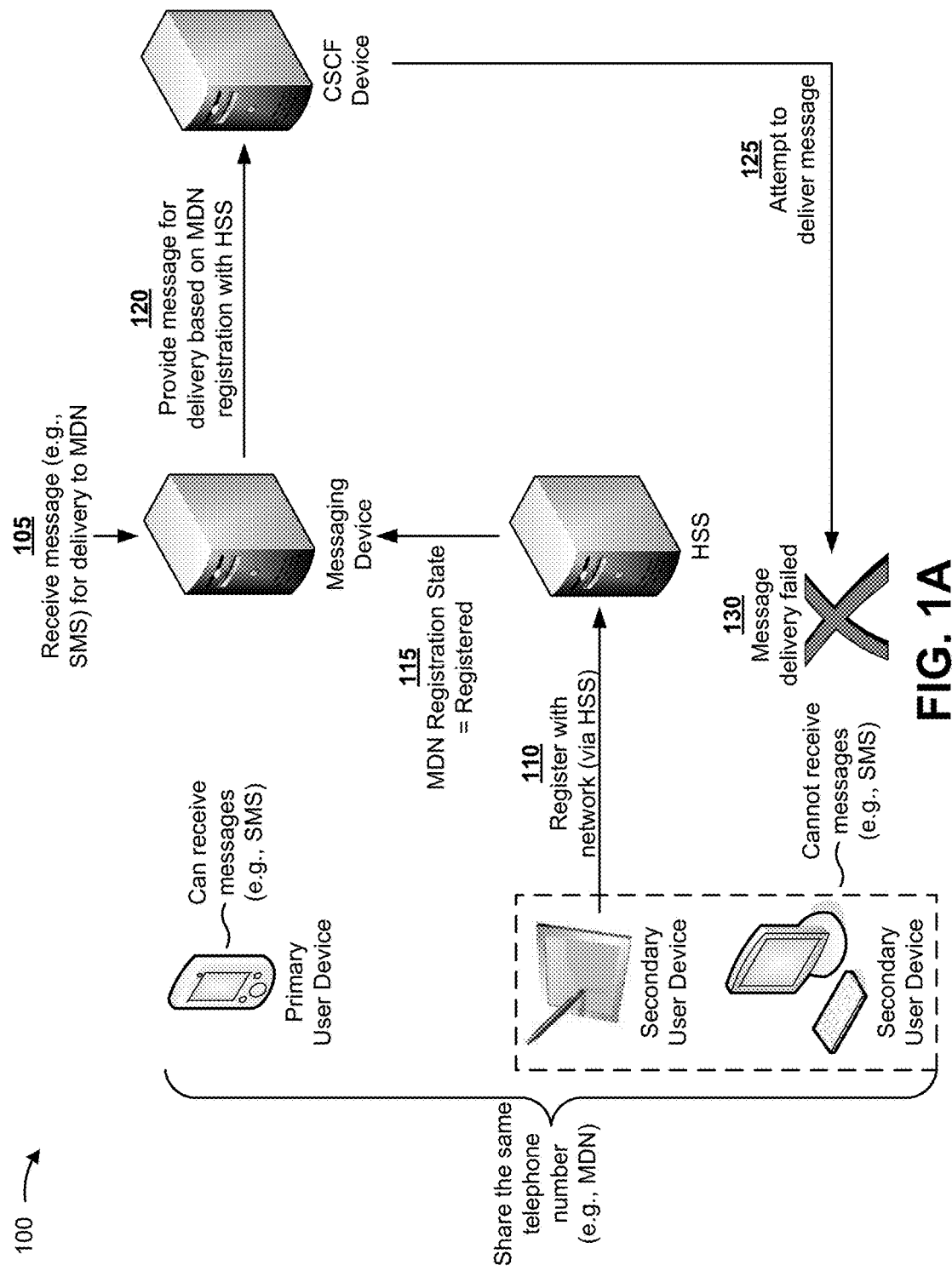
FIGS. 1A-1C are diagrams of an overview of an example implementation described herein.
Figure 1B:
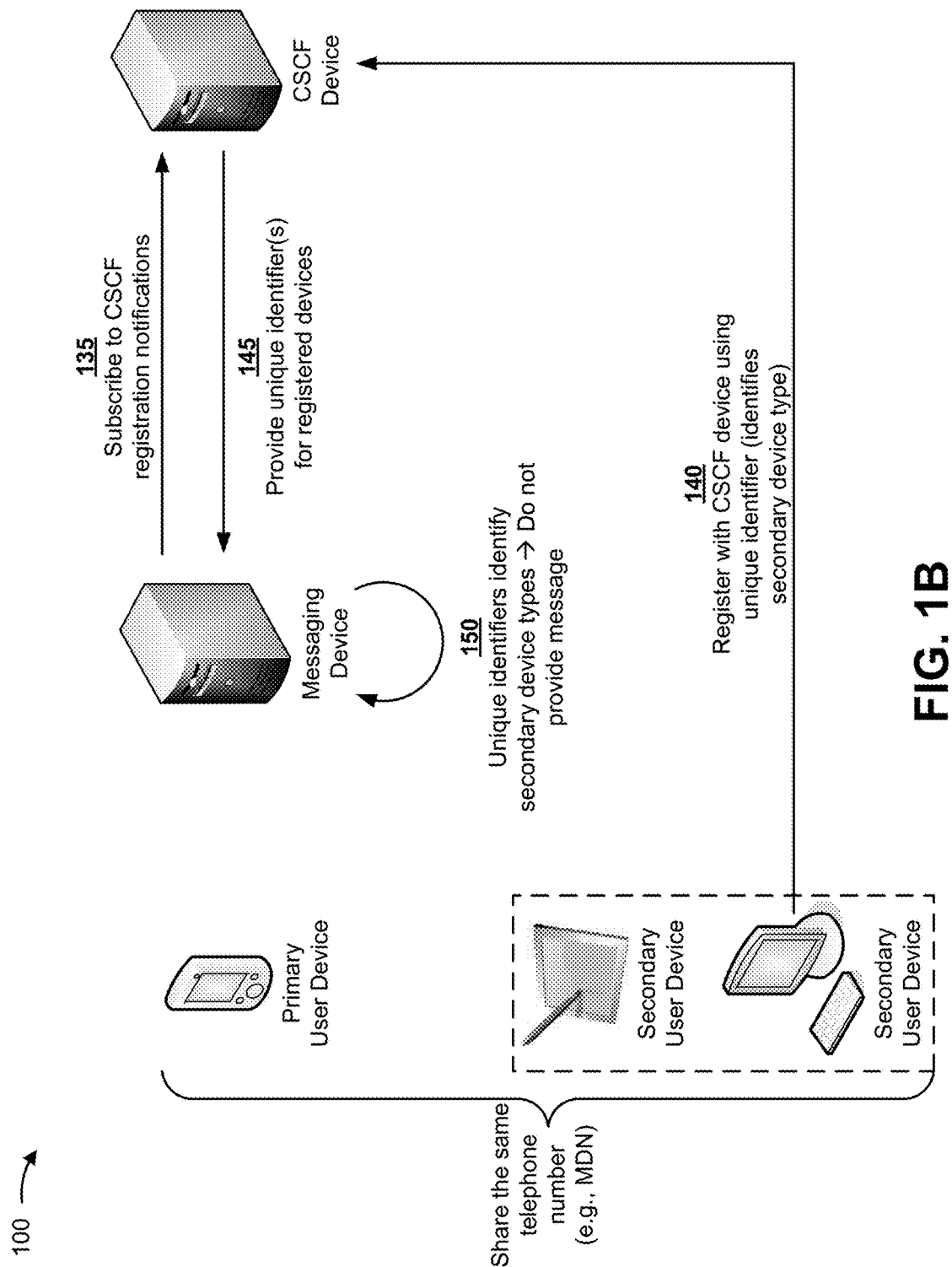
Figure 1C:
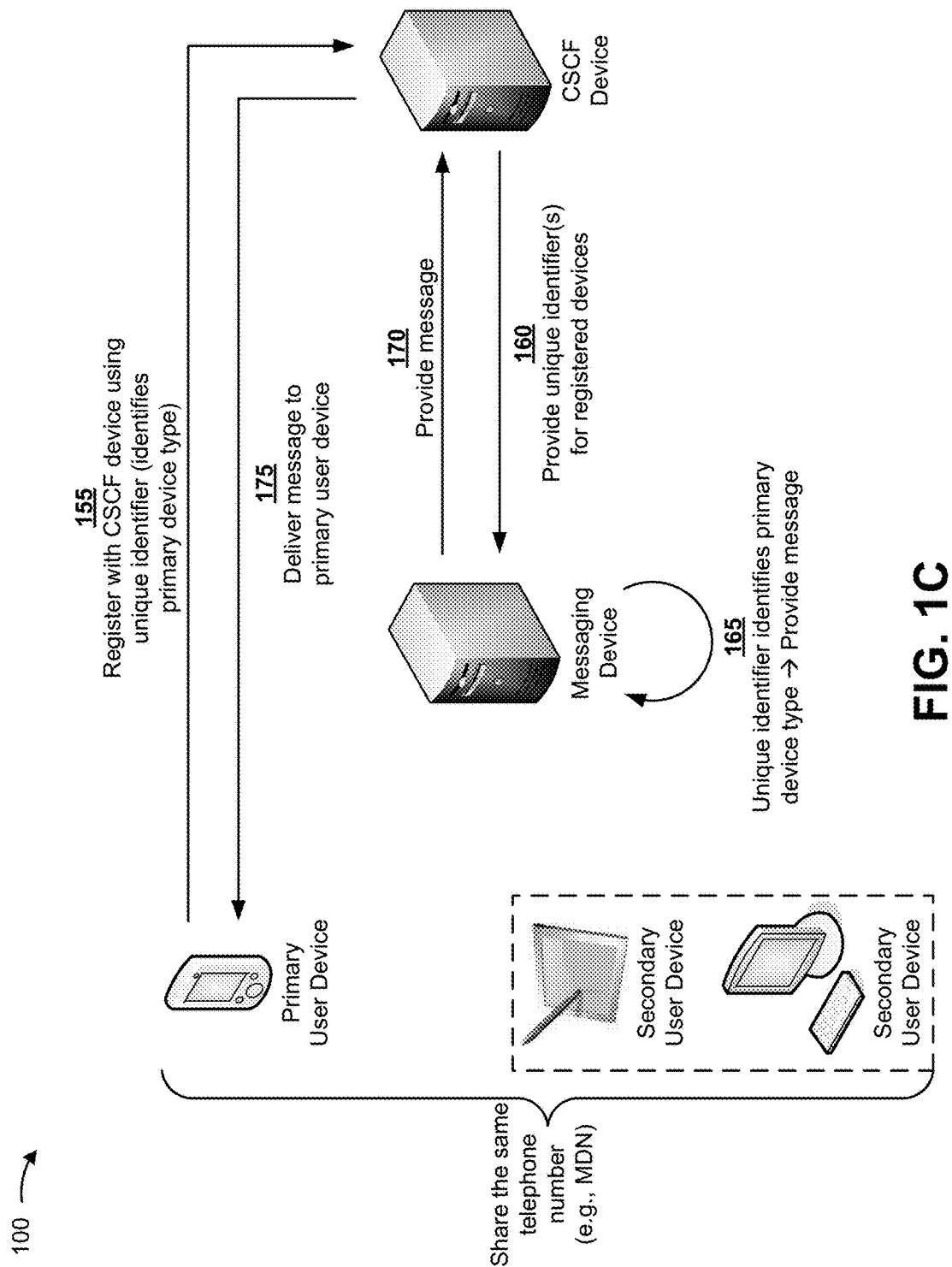

FIGS. 1A-1C are diagrams of an overview of an example implementation 100 described herein. As shown in FIG. 1A, assume that example implementation 100 includes a primary user device (e.g., a mobile phone) capable of receiving a particular type of message (e.g., an SMS message), and two secondary user devices incapable of receiving the particular type of message. As an example, the two secondary devices are shown as a tablet computer and a desktop computer. Assume that the primary user device and the secondary user devices share the same telephone number (e.g., the same MDN).

As further shown in FIG. 1A, assume that example implementation 100 includes a home subscriber server (HSS), a messaging device, and a call session control function (CSCF) device. The HSS may be responsible for notifying the messaging device when a new telephone number registers with the HSS (e.g., when a user device, associated with the telephone number, connects to a network associated with the HSS). The messaging device may be responsible for storing, forwarding, converting, and/or delivering messages to user devices via the CSCF device. The CSCF device may also register user devices that connect to a network associated with the CSCF device (e.g., using a session initiation protocol).

As shown by reference number 105, assume that the messaging device receives a message, such as an SMS message, for delivery to a user device associated with an MDN that is shared by the primary user device and the secondary user devices. As shown by reference number 110, assume that a secondary user device (e.g., the tablet computer) registers with the network via the HSS. For example, the secondary user device may provide the shared MDN to the HSS to register with the network. Based on receiving the shared MDN and registering the secondary user device, the HSS may provide a registration state, associated with the MDN, to the messaging device. For example, as shown by reference number 115, assume that the HSS provides an indication that the MDN has been registered (e.g., MDN Registration State=Registered).

As shown by reference number 120, based on receiving the indication that the MDN has been registered, the messaging device may provide the message to the CSCF device for delivery. As shown by reference number 125, the CSCF device may attempt to deliver the message to the secondary user device (e.g., the tablet computer). However, because the secondary user device is incapable of receiving the message, delivery of the message may fail, as shown by reference number 130. In this case, the CSCF device may provide an indication, to the messaging device, that delivery of the message has failed.

As shown in FIG. 1B, and by reference number 135, the messaging device may subscribe to receive CSCF registration notifications based on the failed message delivery. In some implementations, the messaging device may subscribe to receive CSCF registration notifications based on determining that the MDN is shared by multiple devices. Based on this subscription, the CSCF device may notify the messaging device when a new user device registers with the CSCF device. Furthermore, the CSCF device may provide unique identifier(s) corresponding to the user device(s) registered with the CSCF device. For example, as shown by reference number 140, assume that another secondary user device (e.g., a desktop computer) registers with the CSCF device using a unique identifier. The unique identifier may identify the secondary user device, and may indicate that the secondary user device is of a secondary device type (e.g., is incapable of receiving the message).

As shown by reference number 145, based on the registration, assume that the CSCF device provides the unique identifier to the messaging device. As shown by reference number 150, the messaging device may determine that the unique identifier is associated with a secondary device type. Thus, the messaging device may not provide the message for delivery.

As shown in FIG. 1C, and by reference number 155, assume that the primary user device registers with the CSCF device using a unique identifier. The unique identifier may identify the primary user device, and may indicate that the primary user device is of a primary device type (e.g., is able to receive the message). In some implementations, the primary user device may also register with the HSS (not shown). As shown by reference number 160, based on the registration, assume that the CSCF device provides the unique identifier to the messaging device. As shown by reference number 165, the messaging device may determine that the unique identifier is associated with a primary device type. Thus, as shown by reference number 170, the messaging device may provide the message to the CSCF device for delivery to the primary user device. As shown by reference number 175, the CSCF device may deliver the message to the primary user device.

In this way, the messaging device may differentiate between primary user devices, able to receive a particular type of message, and secondary user devices unable to receive the particular type of message. In some cases, the messaging device may prevent a message, of the particular type, from being provided to a secondary user device, thereby conserving network resources that would otherwise be wasted as a result of a failed delivery of the message. In some cases, the messaging device may receive a notification, from the CSCF device, when a primary user device registers with a network. The messaging device may not have received such a notification from the HSS because the HSS may have already registered a shared telephone number associated with the primary user device. Based on receiving the notification from the CSCF device, the messaging device may assist in timely delivery of the message to the primary user device.

Figure 2:
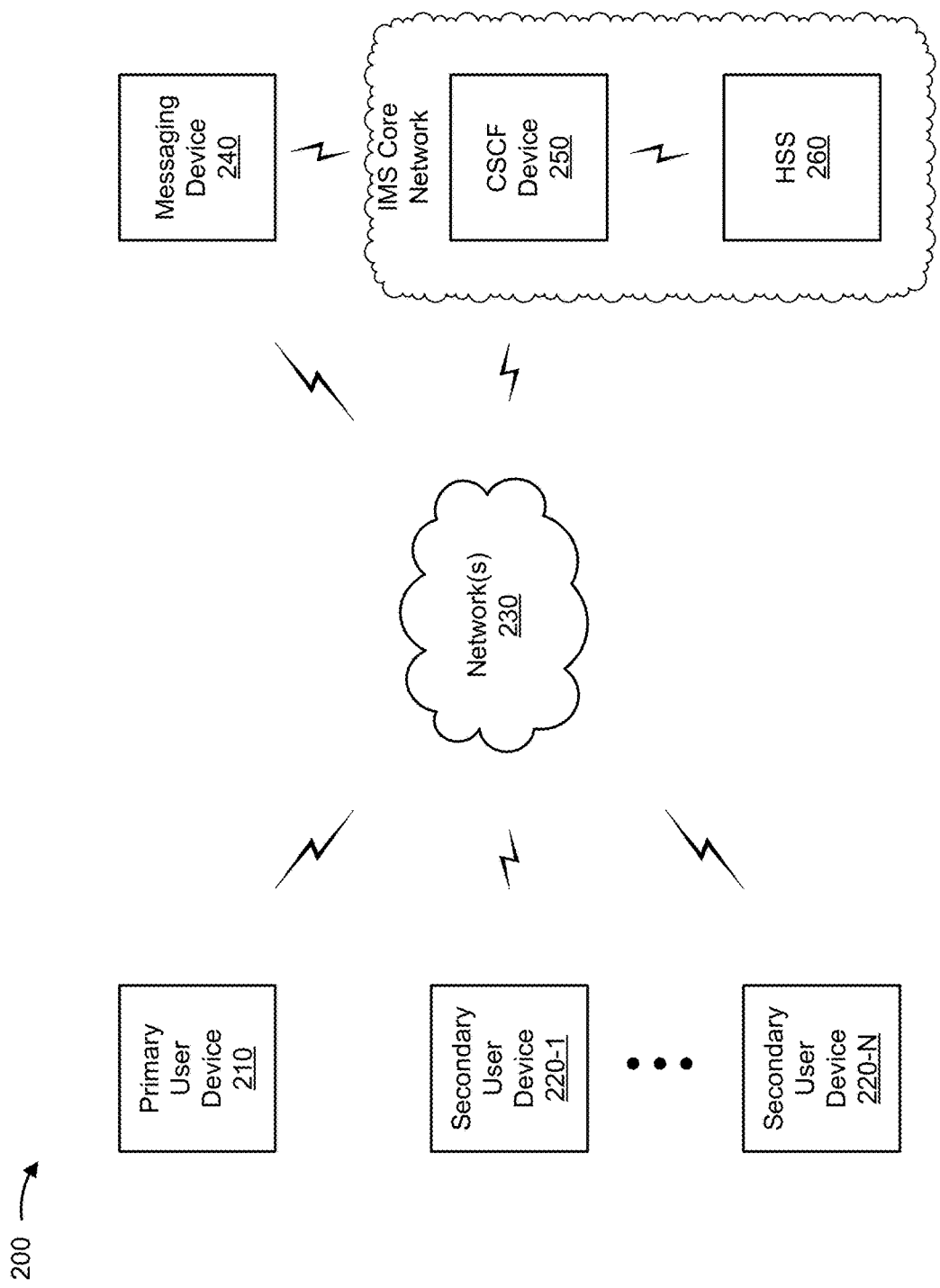
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a primary user device 210, one or more secondary user devices 220-1 through 220-N (N≥1) (hereinafter referred to collectively as "secondary user devices 220," and individually as "secondary user device 220"), network(s) 230, a messaging device 240, a call session control function (CSCF) device 250, and a home subscriber server (HSS) 260. Devices of environment 200 may interconnect via wired connections, wireless connections, or a combination of wired and wireless connections.

Primary user device 210 may include one or more devices capable of receiving a message (e.g., a particular type of message) from messaging device 240 via CSCF device 250. For example, primary user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, primary user device 210 may be able to receive a particular type of message based on a capability of primary user device 210. Additionally, or alternatively, primary user device 210 may be able to receive the particular type of message based on a device configuration, a network configuration, or the like. For example, a network administrator may program one or more devices associated with network 230 to permit primary user device 210 to receive the particular type of message.

Secondary user device 220 may include one or more devices incapable of receiving a message (e.g., a particular type of message) from messaging device 240 via CSCF device 250. For example, secondary user device 220 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, secondary user device 220 may be unable to receive a particular type of message based on a capability of secondary user device 220. Additionally, or alternatively, secondary user device 220 may be unable to receive the particular type of message based on a device configuration, a network configuration, or the like. For example, a network administrator may program one or more devices associated with network 230 to prevent secondary user device 220 from receiving the particular type of message. In some implementations, one or more primary user devices 210 and/or one or more secondary user devices may share a telephone number.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Messaging device 240 may include one or more devices capable of storing, forwarding, converting, and/or directing a message to a destination (e.g., primary user device 210) via network 230. For example, messaging device 240 may include a short message service center (SMSC) device, a multimedia messaging service center (MSMC) device, an email server, an instant messaging server, or a similar device. In some implementations, messaging device 240 may receive a message and may store the message for later delivery to primary user device 210. In some implementations, messaging device 240 may communicate with CSCF device 250 using a session initiation protocol. In some implementations, messaging device 240 may communicate with HSS 260 using a DIAMETER protocol, a RADIUS protocol, or the like.

CSCF device 250 may include one or more devices capable of managing signal and control functions in an Internet Protocol Multimedia Subsystem (IMS) core network. For example, CSCF device 250 may include one or more servers included in the IMS core network, such as a Serving CSCF (S-CSCF) server, a Proxy CSCF (P-CSCF) server, an Interrogating CSCF (I-CSCF) server, or the like. In some implementations, CSCF device 250 may be associated with and/or responsible for delivery of messages to primary user device 210. In some implementations, CSCF device 250 may be capable of receiving, determining, storing, generating, and/or providing information that causes primary user device 210 and/or secondary user device 220 to register with CSCF device 250 and/or the IMS core network. In some implementations, CSCF device 250 may communicate with HSS 260 to determine information (e.g., registration information, authentication information, location information, etc.) associated with primary user device 210 and/or secondary user device 220. CSCF device 250 is provided in environment 200 as an example. In some implementations, CSCF device 250 may be another type of message delivery device.

HSS 260 may include one or more devices, such as one or more server devices, capable of managing subscription and/or other information associated with primary user device 210 and/or secondary user device 220. In some implementations, HSS 260 may be capable of receiving, determining, storing, generating, and/or providing information that causes primary user device 210 and/or secondary user device 220 to register with HSS 260 and/or the IMS core network. In some implementations, HSS 260 may store information that identifies a CSCF device 250 for serving primary user device 210 and/or secondary user device 220. HSS 260 is provided in environment 200 as an example. In some implementations, HSS 260 may be another type of subscription information storage device, such as a home location register (HLR).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
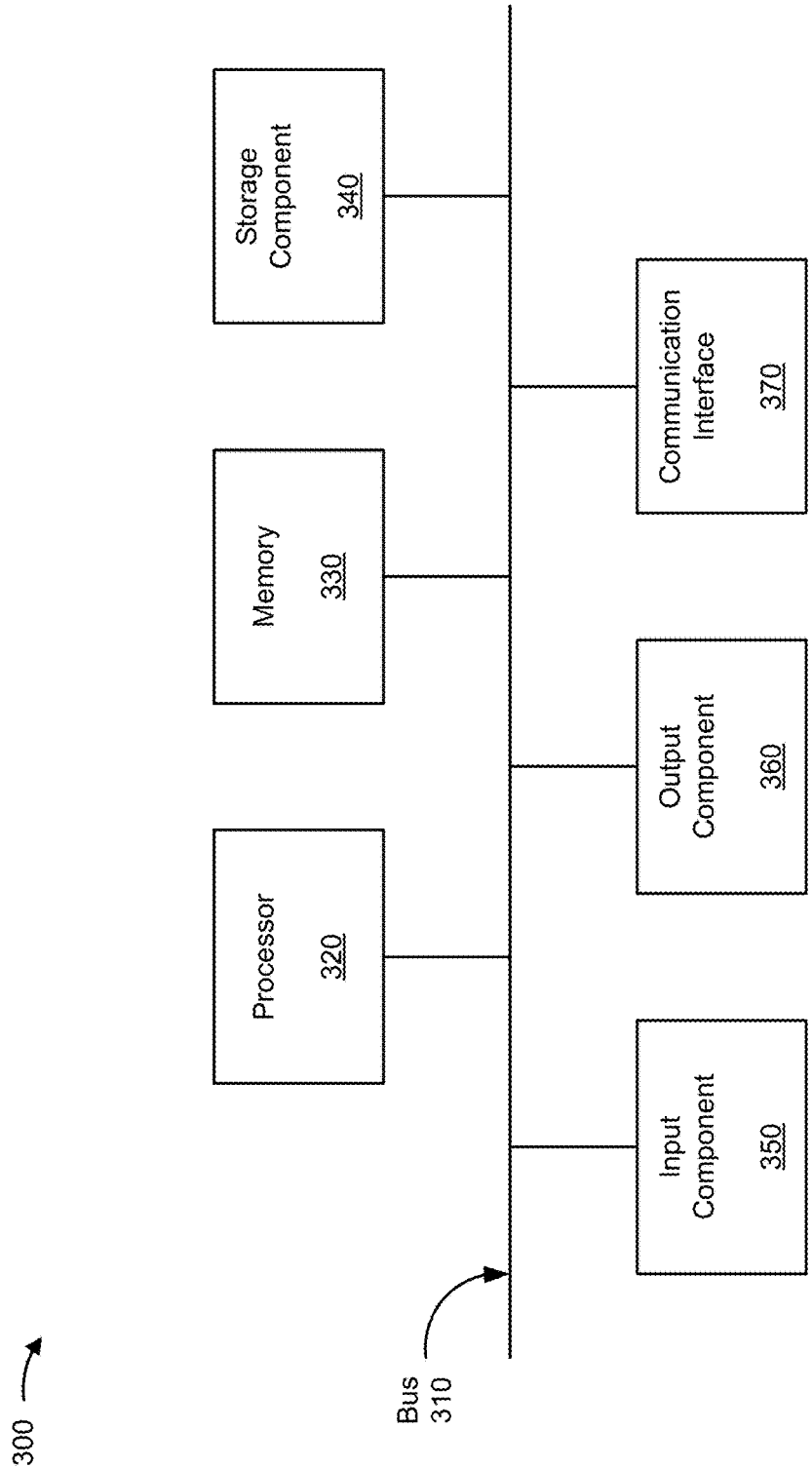
FIG. 3 is a diagram of example components of one or more devices of FIG. 2.

FIG. 3 is a diagram of example components of a device 300. Device 300 may correspond to primary user device 210, secondary user device 220, messaging device 240, CSCF device 250, and/or HSS 260. In some implementations, primary user device 210, secondary user device 220, messaging device 240, CSCF device 250, and/or HSS 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
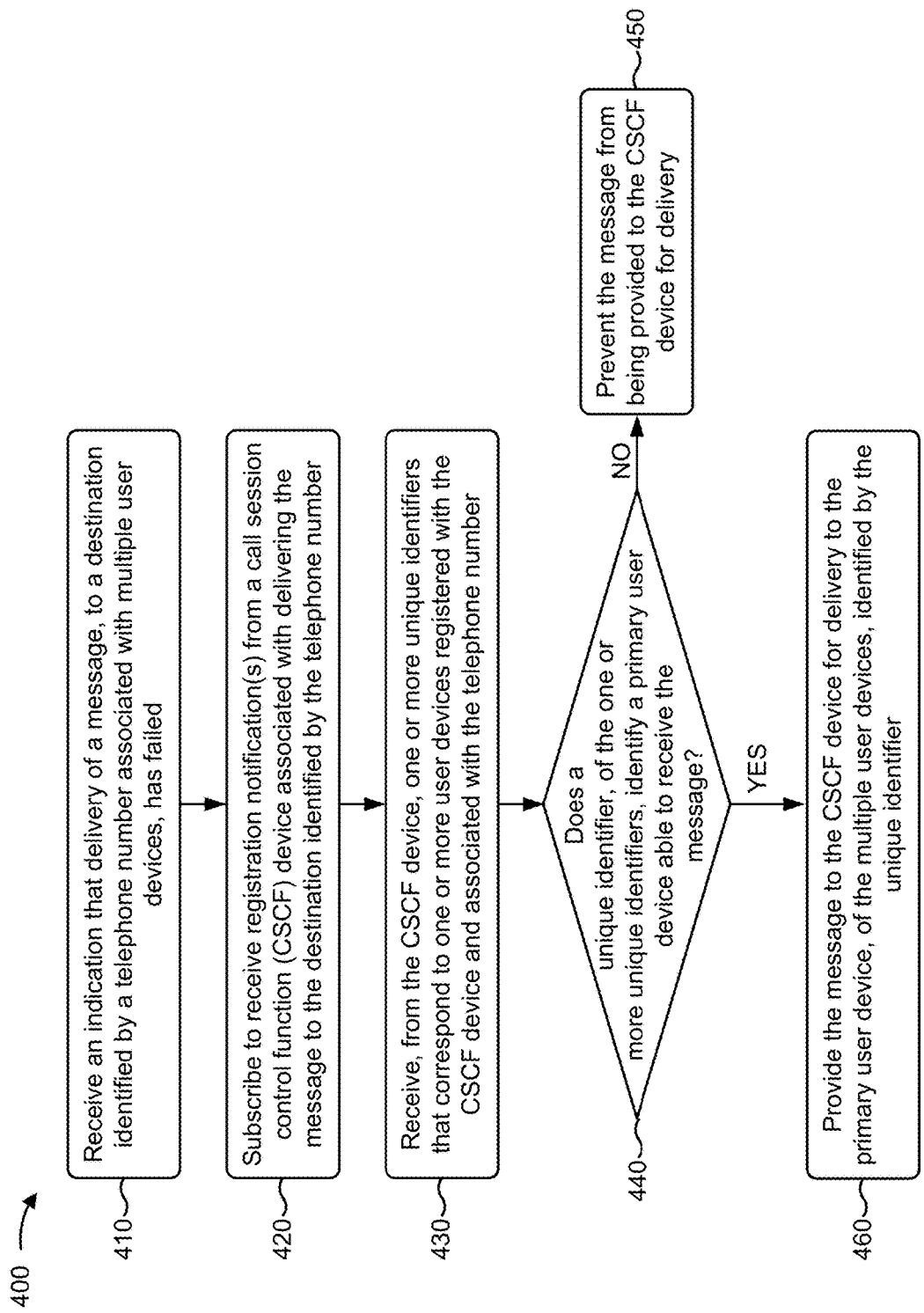
FIG. 4 is a flow chart of an example process for selective delivery of messages to user devices that share a telephone number.

FIG. 4 is a flow chart of an example process 400 for selective delivery of messages to user devices that share a telephone number. In some implementations, one or more process blocks of FIG. 4 may be performed by messaging device 240. In some implementations, one or more process blocks of FIG. 4 may be performed by another device or a set of devices separate from or including messaging device 240, such as primary user device 210, secondary user device 220, CSCF device 250, and/or HSS 260.

As shown in FIG. 4, process 400 may include receiving an indication that delivery of a message, to a destination identified by a telephone number associated with multiple user devices, has failed (block 410). For example, messaging device 240 may receive a message. The message may be a particular type of message, such as a text message (e.g., an SMS message, an MMS message, an email message, etc.), a graphical message (e.g., an image, a picture, etc.), an audio message (e.g., a voice message, a ringtone, etc.), a video message, or the like. For example, the message may include text, graphics, audio, and/or video. In some implementations, the message may be a particular type of message in a particular format.

Messaging device 240 may identify a telephone number that identifies a destination for the message (e.g., a destination device, such as a user device, for which the message is intended). For example, the message may include the telephone number, may include information that identifies the telephone number, or the like. The telephone number may include, for example, a mobile directory number (MDN), a mobile identification number (MIN), a mobile subscription identification number (MSIN), an international mobile subscriber identity (IMSI), a short IMSI, a mobile station identifier (MSID), or the like.

The telephone number may be associated with multiple user devices. For example, the telephone number may be associated with one or more primary user devices 210 and/or one or more secondary user devices 220. In other words, the telephone number may be shared by multiple user devices. In some implementations, messaging device 240 may receive information that identifies a telephone number, and may receive an indication that the telephone number is associated with multiple user devices. In other words, messaging device 240 may receive an indication that a telephone number is a shared telephone number. For example, when a user registers and/or associates multiple user devices with a telephone number (e.g., by interacting with an input device, such as a user device), messaging device 240 may receive an indication that the telephone number is associated with multiple user devices. Messaging device 240 may store this indication, and may use this indication when subscribing to a CSCF registration notification, as described in more detail below.

In some implementations, messaging device 240 may receive an indication, from CSCF device 250, that delivery of a message has failed. For example, messaging device 240 may receive a message, and may identify a CSCF device 250 associated with the message (e.g., associated with a telephone number of a destination device for which the message is intended). Messaging device 240 may provide the message to the identified CSCF device 250 for delivery to the destination device. CSCF device 250 may attempt to deliver the message. When message delivery fails, CSCF device 250 may determine that message delivery has failed, and may provide an indication of the message delivery failure to messaging device 240.

As an example, assume that messaging device 240 receives a message that identifies the shared telephone number. Based on receiving the message, messaging device 240 queries HSS 260 to determine whether there are any user devices, associated with the shared telephone number, that are registered with HSS 260. Assume that HSS 260 provides an indication, to messaging device 240, that there is a user device, associated with the telephone number, that is registered with HSS 260. As an example, the user device may be registered when HSS 260 receives the query from messaging device 240. As another example, there may not be any user devices, associated with the telephone number, that are registered when HSS 260 receives the query from messaging device 240. In this case, messaging device 240 may subscribe to receive HSS registration notifications from HSS 260. The user device may later register with HSS 260, and HSS 260 may provide an indication of the registration to messaging device 240.

Based on receiving an indication that a user device, associated with the telephone number, is registered with HSS 260, messaging device 240 may provide the message to a particular CSCF device 250 associated with the telephone number. In some cases, messaging device 240 may provide the telephone number to HSS 260, and may receive, from HSS 260, a CSCF device identifier that identifies a particular CSCF device 250 associated with the telephone number. The CSCF device identifier may include, for example, a network address of CSCF device 250 (e.g., an Internet protocol (IP) address, a media access control (MAC) address, a domain name, a fully qualified domain name (FQDN), etc.). Messaging device 240 may provide the message to a particular CSCF device 250 identified by the CSCF device identifier.

CSCF device 250 may receive the message, and may attempt to deliver the message to a user device associated with the telephone number. If the user device is a primary user device 210 that is able to receive the message, then message delivery may be successful. In this case, CSCF device 250 may provide an indication, to messaging device 240, that message delivery was successful. However, if the user device is a secondary user device 220 that is not able to receive the message, then message delivery may fail. In this case, CSCF device 250 may provide an indication, to messaging device 240, that message delivery has failed.

As further shown in FIG. 4, process 400 may include subscribing to receive registration notification(s) from a CSCF device associated with delivering the message to the destination identified by the telephone number (block 420). For example, when message delivery fails, messaging device 240 may subscribe to receive registration notifications from CSCF device 250. These registration notifications may be referred to as CSCF registration notifications, as opposed to HSS registration notifications, which may be received from HSS 260. In some cases, messaging device 240 may subscribe to receive registration notifications from a particular CSCF device 250 to which the message was provided, from which an indication of message delivery failure was received, or the like. Messaging device 240 may subscribe by requesting a registration notification, which may cause CSCF device 250 to send a registration notification to messaging device 240 when a user device registers with CSCF device 250.

Messaging device 240 may provide, to CSCF device 250, a telephone number in association with the subscription request. By providing a telephone number, CSCF device 250 may provide a registration notification to messaging device 240 when a user device, associated with that telephone number, registers with CSCF device 250.

In some implementations, messaging device 240 may determine whether a telephone number is associated with multiple user devices before providing a subscription request, associated with the telephone number, to CSCF device 250. For example, messaging device 240 may search a data structure for an indication of whether the telephone number is associated with multiple user devices. If the telephone number is not associated with multiple user devices, then messaging device 240 may not send the subscription request to CSCF device 250. If the telephone number is associated with multiple user devices, then messaging device 240 may send the subscription request to CSCF device 250. In this way, messaging device 240 may reduce unnecessary network traffic by only subscribing to receive registration notifications for shared telephone numbers.

In some implementations, messaging device 240 may provide, to CSCF device 250, expiration information in association with the subscription request. The expiration information may identify, for example, a time period during which the subscription request is valid. If a user device registers with CSCF device 250 before the expiration of the time period, then CSCF device 250 may provide a registration notification to messaging device 240. If a user device registers with CSCF device 250 after the expiration of the time period, then CSCF device 250 may not provide a registration notification to messaging device 240.

In some cases, messaging device 240 may set the time period based on an amount of time that a message will be stored by messaging device 240. For example, messaging device 240 may set the time period for expiration to be greater than or equal to the amount of time that messages are stored by messaging device 240. In this way, messaging device 240 may avoid wasting network resources that would be required to re-subscribe to CSCF registration notifications. In some implementations, messaging device 240 may set the time period for expiration to be less than the amount of time that messages are stored by messaging device 240. In this case, messaging device 240 may re-subscribe to the CSCF registration notifications upon expiration of the time period (e.g., until messaging device 240 deletes a message from storage).

Additionally, or alternatively, when message delivery fails, messaging device 240 may subscribe to receive registration notifications from HSS 260 (e.g., may subscribe to receive HSS registration notifications). Messaging device 240 may subscribe to receive HSS registration notifications in case all user devices, associated with a shared telephone number, become unregistered with HSS 260. In this case, CSCF device 250 may delete subscription requests associated with the telephone number since the telephone number is no longer registered on the network. By subscribing to receive HSS registration notifications, messaging device 240 can ensure that messaging device 240 will be notified of user device registration from HSS 260 in the case where registration notifications will not be received from CSCF device 250.

As further shown in FIG. 4, process 400 may include receiving, from the CSCF device, one or more unique identifiers that correspond to one or more user devices registered with the CSCF device and associated with the telephone number (block 430). For example, a user device may register with CSCF device 250. The user device may be, for example, primary user device 210 or secondary user device 220. The user device may provide, to CSCF device 250, a unique identifier, that identifies the user device, and a telephone number associated with the user device. CSCF device 250 may determine whether the telephone number is associated with a subscription request received from messaging device 240. If the telephone number is associated with a subscription request, then CSCF device 250 may provide the unique identifier to messaging device 240. For example, CSCF device 250 may provide the unique identifier as part of a registration notification provided to messaging device 240.

The unique identifier may include, for example, a session initiation protocol (SIP) instance identifier for the user device. Additionally, or alternatively, the unique identifier may include a uniform resource identifier (URI) that identifies the user device (e.g., a uniform resource locator (URL), a uniform resource name (URN), etc.). The unique identifier may uniquely identity the user device, such that the user device may be differentiated from other user devices (e.g., using an international mobile station equipment identity (IMEI), a MAC address, or another type of unique device identifier). In some implementations, the unique identifier may be an identifier other than the shared telephone number (e.g., other than an MDN).

The unique identifier may include a device type indicator that indicates whether the user device is a primary user device or a secondary user device. For example, the unique identifier may include a first string (e.g., of one or more characters) when the user device is a primary user device 210, and may include a second string (e.g., of one or more characters) when the user device is a secondary user device 220. As another example, the unique identifier may include a first device identifier type (e.g., an IMEI) when the user device is a primary user device 210, and may include a second device identifier type (e.g., a MAC address) when the user device is a secondary user device 220.

In some implementations, the unique identifier may include an instance identifier for a SIP instance. For example, assume that a user device has the following unique identifier:

+sip.instance=="<urn:gsma:imei:90420156-025763-0>"

The above unique identifier for a SIP instance includes a string of "imei" that indicates that the user device is a primary user device 210 able to receive a particular type of message (e.g., an SMS message, or the like). The above unique identifier also includes an IMEI (e.g., 90420156-025763-0), which indicates that the user device is a primary user device 219 able to receive the particular type of message.

As another example, assume that a user device has the following unique identifier:

+sip.instance=="<urn:uuid.f81d4fae-7dec-11do-a765-00a0c91e6bf6>"

The above unique identifier for a SIP instance includes a string of "uuid" that indicates that the user device is a secondary user device 220 not able to receive a particular type of message (e.g., an SMS message, or the like). The above unique identifier also includes a MAC address (e.g., f81d4fae-7dec-11do-a765-00a0c91e6bf6), which indicates that the user device is a secondary user device 220 not able to receive the particular type of message.

In some implementations, when a new user device registers with CSCF device 250, CSCF device 250 may send, to messaging device 240, unique identifiers for all user devices registered with CSCF device 250 (e.g., at the time the new user device registers). In some implementations, when a new user device registers with CSCF device 250, CSCF device 250 may send, to messaging device 240, only the unique identifier for the newly-registered user device.

As further shown in FIG. 4, process 400 may include determining whether a unique identifier, of the one or more unique identifiers, identifies a primary user device that is able to receive the message (block 440). For example, messaging device 240 may receive one or more unique identifiers from CSCF device 250. Messaging device 240 may determine whether a unique identifier, of the one or more unique identifiers, identifies a primary user device 210.

As described elsewhere herein, a primary user device 210 may refer to a user device able to receive a particular type of message. As an example, primary user device 210 may be able to receive the particular type of message because of a capability of primary user device 210. As another example, primary user device 210 may be able to receive the particular type of message because of a network configuration (e.g., a network administrator may configure a network to permit primary user device 210 to be able to receive the particular type of message).

Conversely, a secondary user device 220 may refer to a user device not able to receive the particular type of message. As an example, secondary user device 220 may not be able to receive the particular type of message because of a capability of secondary user device 220 (e.g., secondary user device 220 may lack a capability that primary user device 210 does not lack). As another example, secondary user device 220 may not be able to receive the particular type of message because of a network configuration (e.g., a network administrator may configure a network to prevent secondary user device 220 from being able to receive the particular type of message).

In some implementations, messaging device 240 may analyze the unique identifier to determine whether the unique identifier identifies a primary user device 210. For example, the unique identifier may include a first string (e.g., "gsma:imei") when the user device is a primary user device 210, and may include a second string (e.g., "uuid") when the user device is a secondary user device 220. In this case, messaging device 240 may determine that the user device is a primary user device 210 when the unique identifier includes the first string, does not include the second string, or the like. Additionally, or alternatively, messaging device 240 may determine that the user device is not a primary user device 210 when the unique identifier includes the second string, does not include the first string, or the like.

As another example, the unique identifier may include a first device identifier type (e.g., an IMEI) when the user device is a primary user device 210, and may include a second device identifier type (e.g., a MAC address) when the user device is a secondary user device 220. In this case, messaging device 240 may determine that the user device is a primary user device 210 when the unique identifier includes the first device identifier type, does not include the second device identifier type, or the like. Additionally, or alternatively, messaging device 240 may determine that the user device is not a primary user device 210 when the unique identifier includes the second device identifier type, does not include the first device identifier type, or the like.

In some implementations, messaging device 240 may determine the identifier type by searching the unique identifier for a pattern, such as a pattern corresponding to an IMEI, a pattern corresponding to a MAC address, or the like. The pattern may be based on, for example, a sequence of characters, a quantity of characters, an order of characters, one or more particular characters included in the unique identifier, or the like. For example, messaging device 240 may determine that a pattern of "90420156-025763-0" corresponds to an IMEI. Similarly, messaging device 240 may determine that a pattern of "f81d4fae-7dec-11do-a765-00a0c91e6bf6" corresponds to a MAC address.

As further shown in FIG. 4, if the unique identifier does not identify a primary user device (block 440—NO), then process 400 may include preventing the message from being provided to the CSCF device for delivery (block 450). For example, if messaging device 240 determines that the unique identifier does not identify a primary user device 210, then messaging device 240 may prevent the message from being provided to CSCF device 250 for delivery. When a user device registered with CSCF device 250 is a secondary user device 220, then an attempted delivery of the message to the secondary user device 220 by CSCF device 250 may fail because the secondary user device 220 may not be able to receive the message. Thus, messaging device 240 may prevent such a failed delivery by preventing the message from being provide to CSCF device 250 when the user device is a secondary user device 220 (e.g., when the user device is not a primary user device 210). In this way, messaging device 240 may conserve network resources that would otherwise be consumed in association with the failed delivery.

As further shown in FIG. 4, if the unique identifier identifies a primary user device (block 440—YES), then process 400 may include providing the message to the CSCF device for delivery to the primary user device, of the multiple user devices, identified by the unique identifier (block 460). For example, if messaging device 240 determines that the unique identifier identifies a primary user device 210, then messaging device 240 may provide the message to CSCF device 250 for delivery to the primary user device 210.

In some implementations, CSCF device 250 may attempt delivery to primary user device 210, and may receive a delivery indicator that indicates whether the delivery was successful. CSCF device 250 may provide the delivery indicator to messaging device 240. If message delivery is successful, messaging device 240 may delete the message from storage to conserve computing resources of messaging device 240. Additionally, or alternatively, if message delivery is successful, messaging device 240 may unsubscribe from CSCF registration notifications and/or HSS registration notifications associated with the shared telephone number. In this way, messaging device 240 may conserve network resources by eliminating unnecessary registration notifications from being sent when there are no messages, associated with a shared telephone number, stored by messaging device 240.

If message delivery is unsuccessful, messaging device 240 may wait to receive one or more unique identifiers from CSCF device 250. For example, in some cases, a primary user device 210 may register with CSCF device 250, but may become unavailable for message delivery when CSCF device 250 attempts to deliver the message (e.g., due to a poor network connection, due to being disconnected from the network, due to network congestion, etc.). In this case, the primary user device 210 may re-register with CSCF device 250 when the primary user device 210 becomes available for message delivery. Upon re-registration, CSCF device 250 may provide a registration notification to messaging device 240, which may trigger messaging device 240 to provide the message to CSCF device 250 for delivery to the primary user device 210 (e.g., as describe above in connection with blocks 430-460).

In this way, messaging device 240 may determine whether to deliver a message, associated with a telephone number, when there are multiple user devices that share the telephone number. Implementations described herein may reduce instances of failed message delivery. Furthermore, implementations described herein may conserve network resources by reducing network traffic associated with failed delivery of messages to secondary user devices 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
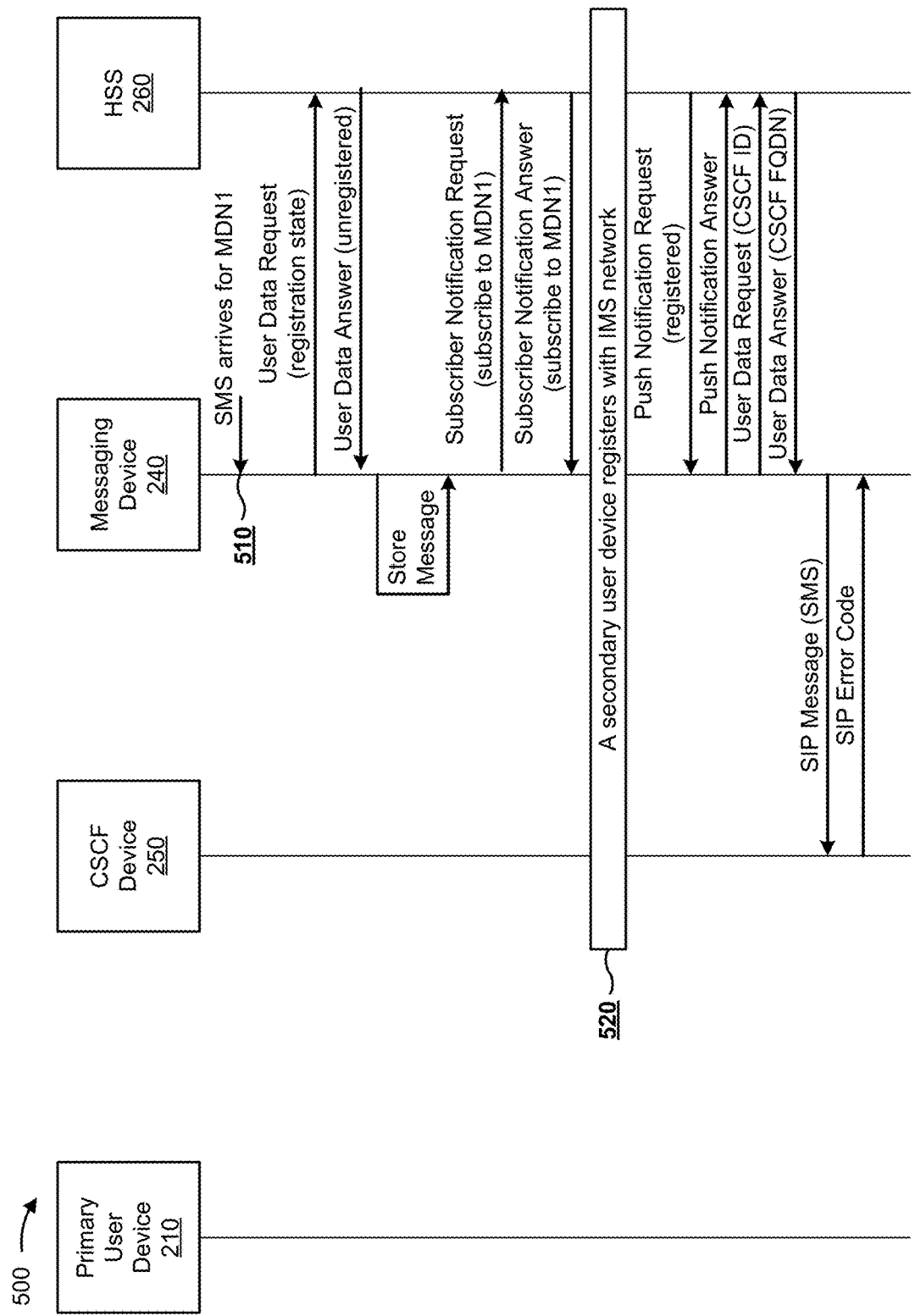
FIGS. 5A and 5B are call flow diagrams of an example implementation relating to the example process shown in FIG. 4.
Figure 5B:
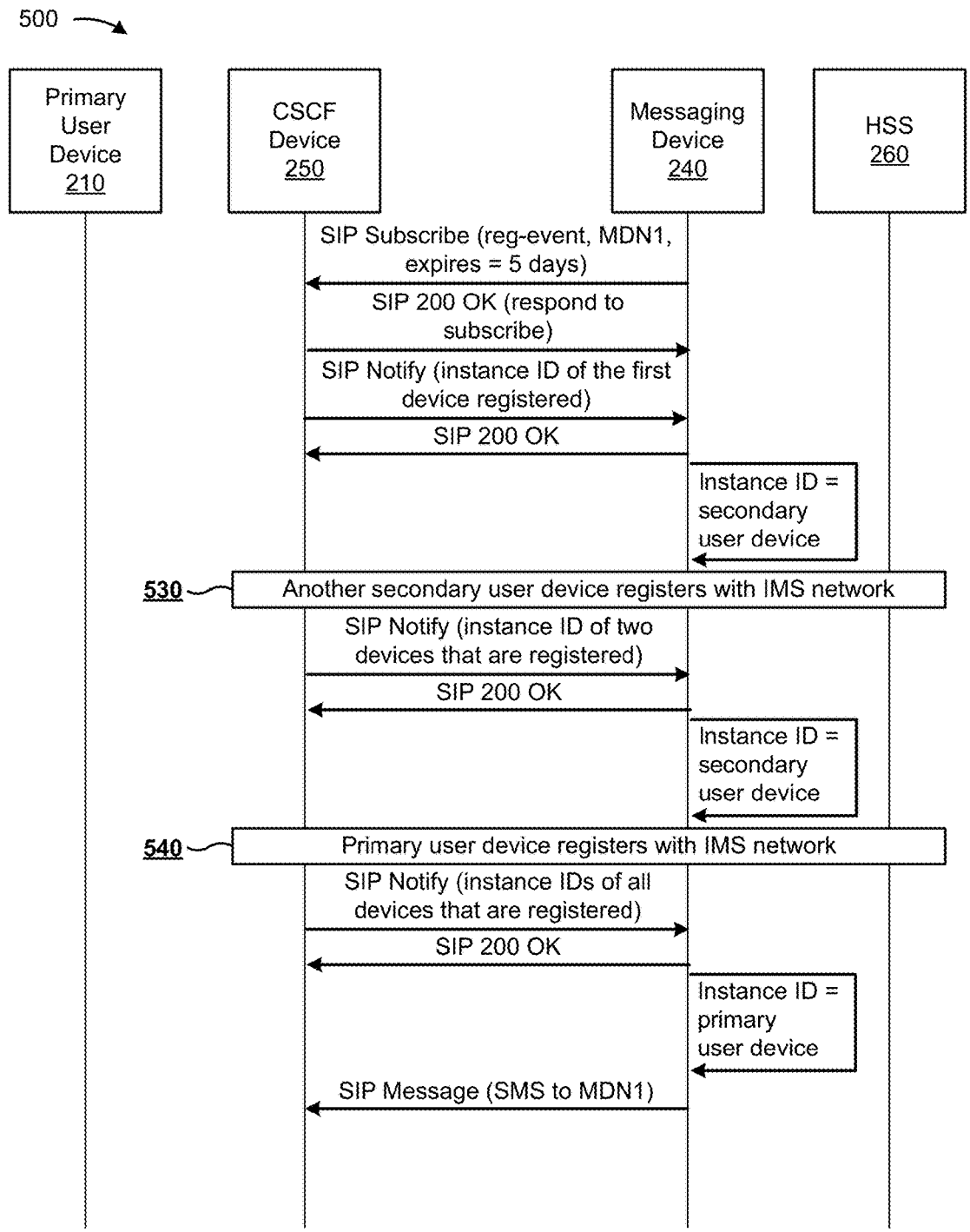

FIGS. 5A and 5B are call flow diagrams of an example implementation 500 relating to example process 400 shown in FIG. 4. FIGS. 5A and 5B show an example of selective delivery of messages to user devices that share a telephone number.

For the purposes of FIGS. 5A and 5B, assume that a particular MDN, shown as MDN1, is associated with multiple user devices. For example, assume that MDN1 is associated with one primary user device, able to receive SMS messages, and two secondary user devices not able to receive SMS messages. Assume that at an initial time period, none of the user devices associated with MDN1 are registered with HSS 260.

As shown in FIG. 5A, and by reference number 510, assume that messaging device 240 receives an SMS message destined for a user device associated with MDN1. As further shown, assume that messaging device 240 sends a user data request to HSS 260 to request a registration state of user devices associated with MDN1. As further shown, assume that HSS 260 provides a user data answer, to messaging device 240, that indicates that no user devices associated with MDN1 are registered with HSS 260. In this case, assume that messaging device 240 stores the message for later delivery, as shown.

Because no user devices associated with MDN1 are registered with HSS 260, assume that messaging device 240 subscribes to HSS registration notifications, associated with MDN1, to receive a registration notification when a user device associated with MDN1 registers with HSS 260. For example, and as shown, assume that messaging device 240 provides a subscriber notification request, to HSS 260, to subscribe to registration notifications for MDN1. As further shown, assume that HSS 260 responds to the subscriber notification request by providing a subscriber notification answer to messaging device 240. The subscriber notification answer may confirm that messaging device 240 is subscribed to receive HSS registration notifications associated with MDN1.

As shown by reference number 520, assume that after messaging device 240 has subscribed to HSS 260, a secondary user device 220 registers with HSS 260 (e.g., registers with an IMS network associated with HSS 260). Based on this registration, assume that HSS 260 provides an HSS registration notification (e.g., shown as a notification request) to messaging device 240, thereby indicating that a user device associated with MDN1 has registered with HSS 260. As shown, assume that messaging device 240 provides a notification answer to HSS 260, which may indicate that the HSS registration notification was received by messaging device 240.

As further shown, assume that messaging device 240 provides a user data request to HSS 260 to request a CSCF identifier associated with MDN1. Based on the user data request, assume that HSS 260 provides a user data answer to messaging device 240, which may include a CSCF device identifier (e.g., a CSCF FQDN). The CSCF device identifier may identify a CSCF device 250 that serves a user device associated with MDN1. As shown, based on receiving the CSCF device identifier, assume that messaging device 240 provides the SMS message (e.g., using SIP) to CSCF device 250 identified by the CSCF device identifier. In this case, since the user device is a secondary user device 220, assume that delivery of the SMS message fails. Thus, as shown, CSCF device 250 provides a SIP error code, to messaging device 240, to indicate that delivery of the SMS message failed.

As shown in FIG. 5B, based on determining that delivery of the message failed, assume that messaging device 240 provides a subscription request to CSCF device 250 (e.g., using a SIP subscribe request). As shown, assume that the subscription request identifies MDN1, and indicates an expiration time period of 5 days, after which the subscription expires and CSCF device 250 will no longer provide CSCF registration notifications to messaging device 240. As further shown, assume that CSCF device 250 acknowledges receipt of the subscription request by sending a "SIP 200 OK" response to messaging device 240.

In this case, assume that a secondary user device 220 is already registered with CSCF device 250. For example, assume that the same secondary user device 220 that registered with HSS 260, as described in connection with FIG. 5A, is also registered with CSCF device 250. Thus, based on the subscription request, assume that CSCF device 250 provides a CSCF registration notification to messaging device 240 (e.g., using a "SIP Notify" message). Assume that the CSCF registration notification includes a unique identifier for the secondary user device 220, such as a SIP instance identifier. As shown, assume that messaging device 240 acknowledges receipt of the CSCF registration notification by sending a "SIP 200 OK" response to CSCF device 250.

As further shown, assume that messaging device 240 analyzes the instance identifier, and determines that the instance identifier identifies a secondary user device 220. In this case, messaging device 240 may prevent the SMS message from being sent to CSCF device 250 for delivery to the secondary user device 220 because delivery to the secondary user device 220 will fail.

As shown by reference number 530, assume that at a later time, another secondary user device 220, associated with MDN1, registers with HSS 260 and CSCF device 250 (e.g., registers with an IMS network associated with HSS 260 and CSCF device 250). In this case, because a user device associated with MDN1 is already registered with HSS 260, HSS 260 may not provide an HSS registration notification to messaging device 240. However, because messaging device 240 is subscribed to receive CSCF registration notifications from CSCF device 250, registration of the other secondary user device 220 may cause CSCF device 250 to provide a CSCF registration notification to messaging device 240 (e.g., using a "SIP Notify" message). Assume that the CSCF registration notification includes a unique identifier for the other secondary user device 220 (e.g., shown as an instance identifier). As shown, assume that messaging device 240 acknowledges receipt of the CSCF registration notification by sending a "SIP 200 OK" response to CSCF device 250.

As further shown, assume that messaging device 240 analyzes the instance identifier, and determines that the instance identifier identifies a secondary user device 220. In this case, messaging device 240 may prevent the SMS message from being sent to CSCF device 250 for delivery to the other secondary user device 220 because delivery to the other secondary user device 220 will fail.

As shown by reference number 540, assume that at a later time, a primary user device 210, associated with MDN1, registers with HSS 260 and CSCF device 250 (e.g., registers with an IMS network associated with HSS 260 and CSCF device 250). Again, because a user device associated with MDN1 is already registered with HSS 260, HSS 260 may not provide an HSS registration notification to messaging device 240. However, because messaging device 240 is subscribed to receive CSCF registration notifications from CSCF device 250, registration of the primary user device 210 may cause CSCF device 250 to provide a CSCF registration notification to messaging device 240 (e.g., using a "SIP Notify" message). Assume that the CSCF registration notification includes a unique identifier for the primary user device 210 (e.g., shown as an instance identifier). As shown, assume that messaging device 240 acknowledges receipt of the CSCF registration notification by sending a "SIP 200 OK" response to CSCF device 250.

As further shown, assume that messaging device 240 analyzes the instance identifier, and determines that the instance identifier identifies a primary user device 210. In this case, messaging device 240 may provide the SMS message to CSCF device 250 for delivery to the primary user device 210. In some cases, based on successfully delivery of the SMS message, messaging device 240 may delete the SMS message from storage, may unsubscribe from CSCF registration notifications associated with MDN1, and/or may unsubscribe from HSS registration notifications associated with MDN1, as described in more detail elsewhere herein. In this way, messaging device 240 may selectively provide SMS messages (or other types of messages) to CSCF device 250 for delivery to user devices. This may conserve network resources by preventing a message delivery attempt when delivery is likely to fail, and permitting a message delivery attempt when delivery is likely to succeed.

As indicated above, FIGS. 5A and 5B are provided merely as an example. Other examples are possible and may differ from what was described with regard to FIGS. 5A and 5B.

Figure 6A:
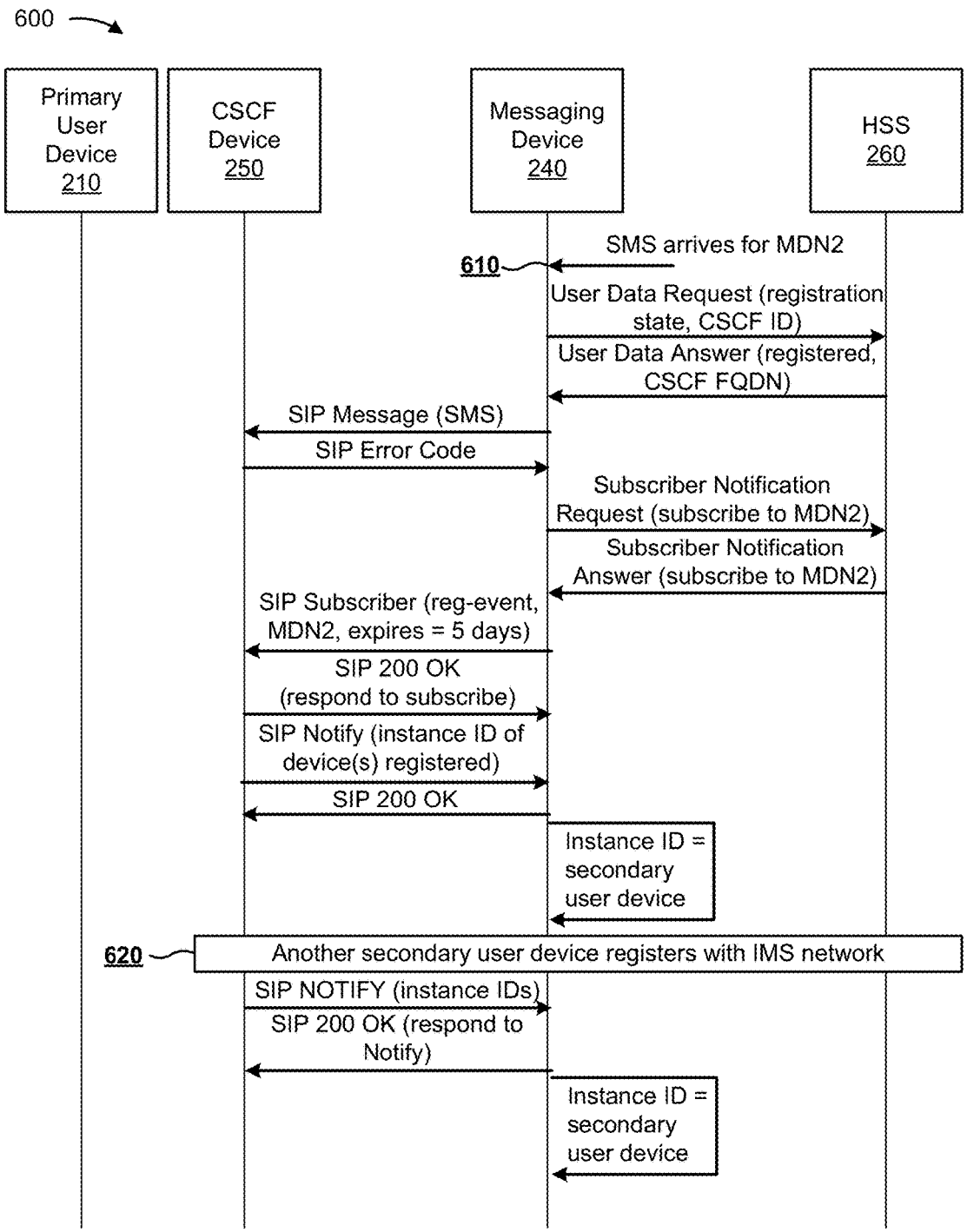
FIGS. 6A and 6B are call flow diagrams of an example implementation relating to the example process shown in FIG. 4.
Figure 6B:
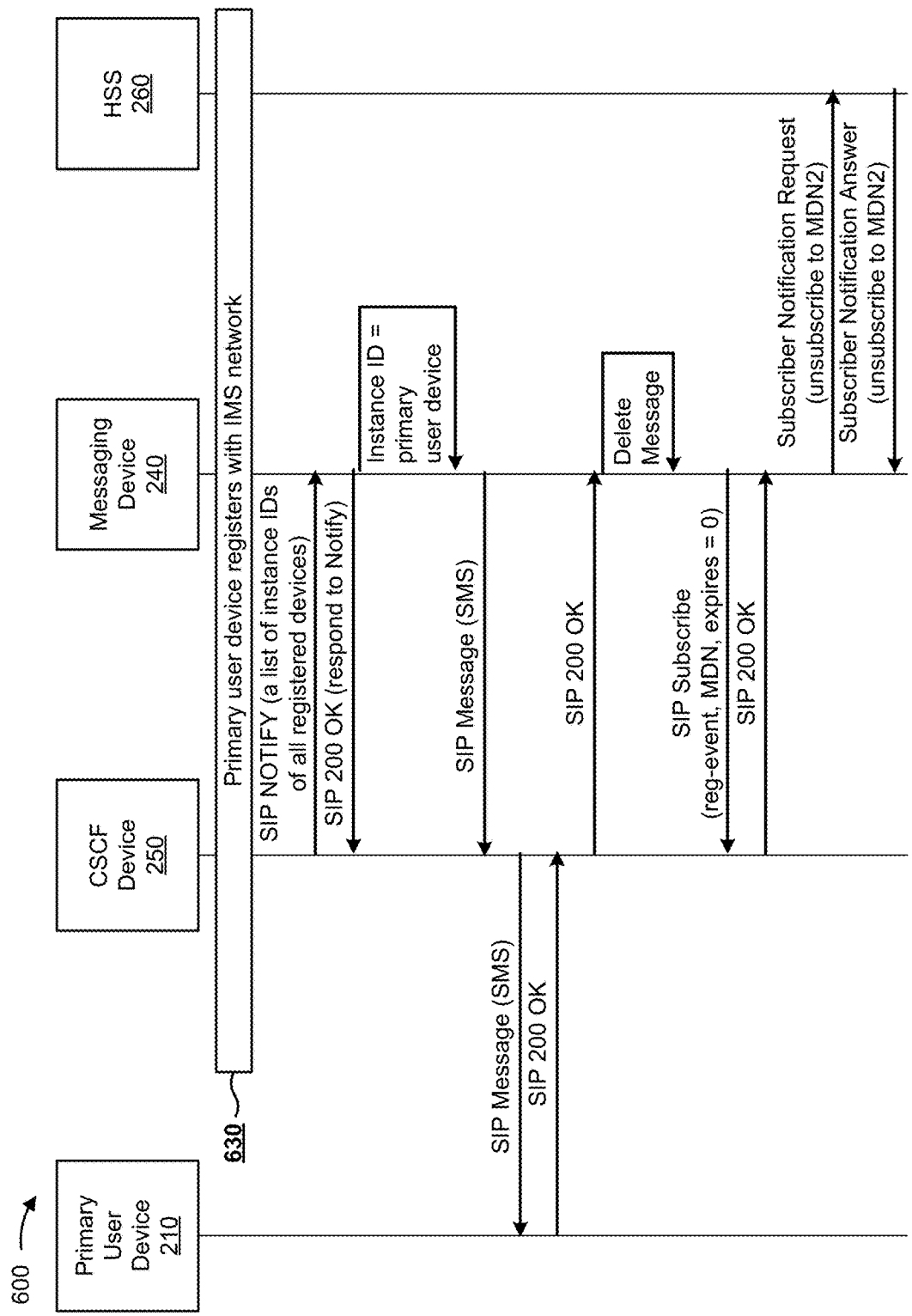

FIGS. 6A and 6B are call flow diagrams of an example implementation 600 relating to example process 400 shown in FIG. 4. FIGS. 6A and 6B show an example of selective delivery of messages to user devices that share a telephone number.

For the purposes of FIGS. 6A and 6B, assume that a particular MDN, shown as MDN2, is associated with multiple user devices. For example, assume that MDN2 is associated with one primary user device, able to receive SMS messages, and two secondary user devices not able to receive SMS messages. Assume that at an initial time period, one of the secondary user devices 220 associated with MDN2 is registered with HSS 260 and CSCF device 250.

As shown in FIG. 6A, and by reference number 610, assume that messaging device 240 receives an SMS message destined for a user device associated with MDN2. As further shown, assume that messaging device 240 sends a user data request to HSS 260 to request a registration state of user devices associated with MDN2. As further shown, assume that HSS 260 provides a user data answer to messaging device 240. As shown, the user data answer may indicate that a user device associated with MDN2 is registered with HSS 260, and may include a CSCF device identifier that identifies a CSCF device 250 associated with MDN2 (e.g., using a CSCF FQDN).

As further shown, based on receiving the CSCF device identifier, assume that messaging device 240 provides the SMS message (e.g., using SIP) to CSCF device 250 identified by the CSCF device identifier. In this case, since the user device is a secondary user device 220, assume that delivery of the SMS message fails. Thus, as shown, CSCF device 250 provides a SIP error code, to messaging device 240, to indicate that delivery of the SMS message failed.

As shown, assume that messaging device 240 subscribes to HSS registration notifications, associated with MDN2, to receive a registration notification when a user device associated with MDN2 registers with HSS 260. For example, and as shown, assume that messaging device 240 provides a subscriber notification request, to HSS 260, to subscribe to registration notifications for MDN2. As further shown, assume that HSS 260 responds to the subscriber notification request by providing a subscriber notification answer to messaging device 240. The subscriber notification answer may confirm that messaging device 240 is subscribed to receive HSS registration notifications associated with MDN2. However, because a user device associated with MDN2 is already registered with HSS 260, HSS 260 may not provide an HSS registration notification to messaging device 240 unless all user devices associated with MDN2 become unregistered, followed by a subsequent registration of a user device associated with MDN2. Thus, messaging device 240 may subscribe to CSCF registration notifications to be notified when another user device, associated with MDN2, registers with the IMS network.

For example, and as shown, assume that messaging device 240 provides a subscription request to CSCF device 250 (e.g., using a SIP subscribe request). As shown, assume that the subscription request identifies MDN2, and indicates an expiration time period of 5 days, after which the subscription expires and CSCF device 250 will no longer provide CSCF registration notifications to messaging device 240. As further shown, assume that CSCF device 250 acknowledges receipt of the subscription request by sending a "SIP 200 OK" response to messaging device 240.

As further shown, since a secondary user device 220 is already registered with CSCF device 250, assume that CSCF device 250 provides a CSCF registration notification to messaging device 240 (e.g., using a "SIP Notify" message). Assume that the CSCF registration notification includes a unique identifier for the secondary user device 220, such as a SIP instance identifier. As shown, assume that messaging device 240 acknowledges receipt of the CSCF registration notification by sending a "SIP 200 OK" response to CSCF device 250.

As further shown, assume that messaging device 240 analyzes the instance identifier, and determines that the instance identifier identifies a secondary user device 220. In this case, messaging device 240 may prevent the SMS message from being sent to CSCF device 250 for delivery to the secondary user device 220 because delivery to the secondary user device 220 will fail.

As shown by reference number 620, assume that at a later time, another secondary user device 220, associated with MDN2, registers with HSS 260 and CSCF device 250 (e.g., registers with an IMS network associated with HSS 260 and CSCF device 250). In this case, because a user device associated with MDN2 is already registered with HSS 260, HSS 260 may not provide an HSS registration notification to messaging device 240. However, because messaging device 240 is subscribed to receive CSCF registration notifications from CSCF device 250, registration of the other secondary user device 220 may cause CSCF device 250 to provide a CSCF registration notification to messaging device 240 (e.g., using a "SIP Notify" message). Assume that the CSCF registration notification includes a unique identifier for the other secondary user device 220 (e.g., shown as an instance identifier). As shown, assume that messaging device 240 acknowledges receipt of the CSCF registration notification by sending a "SIP 200 OK" response to CSCF device 250.

As further shown, assume that messaging device 240 analyzes the instance identifier, and determines that the instance identifier identifies a secondary user device 220 (or does not identify a primary user device 210). In this case, messaging device 240 may prevent the SMS message from being sent to CSCF device 250 for delivery to the other secondary user device 220 because delivery to the other secondary user device 220 will fail.

As shown in FIG. 6B, and by reference number 630, assume that at a later time, a primary user device 210, associated with MDN2, registers with HSS 260 and CSCF device 250 (e.g., registers with an IMS network associated with HSS 260 and CSCF device 250). Again, because a user device associated with MDN2 is already registered with HSS 260, HSS 260 may not provide an HSS registration notification to messaging device 240. However, because messaging device 240 is subscribed to receive CSCF registration notifications from CSCF device 250, registration of the primary user device 210 may cause CSCF device 250 to provide a CSCF registration notification to messaging device 240 (e.g., using a "SIP Notify" message). Assume that the CSCF registration notification includes a unique identifier for the primary user device 210 (e.g., shown as an instance identifier). As shown, assume that messaging device 240 acknowledges receipt of the CSCF registration notification by sending a "SIP 200 OK" response to CSCF device 250.

As further shown, assume that messaging device 240 analyzes the instance identifier, and determines that the instance identifier identifies a primary user device 210. In this case, and as shown, messaging device 240 may provide the SMS message to CSCF device 250 for delivery to the primary user device 210. As further shown, CSCF device 250 may provide the SMS message to primary user device 210. Primary user device 210 may acknowledge receipt of the SMS message by sending a "SIP 200 OK" response to CSCF device 250. Based on receipt of the acknowledgement, CSCF device 250 may send a "SIP 200 OK" response to messaging device 240, indicating that the SMS message was successfully delivered.

As shown, based on receiving the indication that the SMS message was successfully delivered, messaging device 240 may delete the SMS message from memory. Additionally, or alternatively, messaging device 240 may unsubscribe from CSCF registration notifications associated with MDN2. For example, messaging device 240 may unsubscribe from CSCF registration notifications by providing a subscription request to CSCF device 250 (e.g., using a SIP subscribe request). As shown, assume that the subscription request identifies MDN2, and indicates an expiration time period of 0, which causes the subscription to expire. As further shown, assume that CSCF device 250 acknowledges receipt of the request to unsubscribe by sending a "SIP 200 OK" response to messaging device 240.

Additionally, or alternatively, messaging device 240 unsubscribe from HSS registration notifications associated with MDN2. For example, messaging device 240 may unsubscribe from HSS registration notifications by providing a subscriber notification request, to HSS 260, indicating a request to unsubscribe from HSS registration notifications associated with MDN2. This request may cause HSS 260 to stop sending registration notifications, associated with MDN2, to messaging device 240. As shown, HSS 260 may acknowledge receipt of the request to unsubscribe by sending a subscriber notification answer to messaging device 240.

In this way, messaging device 240 may selectively provide SMS messages (or other types of messages) to CSCF device 250 for delivery to user devices. This may conserve network resources by preventing a message delivery attempt when delivery is likely to fail, and permitting a message delivery attempt when delivery is likely to succeed.

As indicated above, FIGS. 6A and 6B are provided merely as an example. Other examples are possible and may differ from what was described with regard to FIGS. 6A and 6B.

Implementations described herein provide a mechanism for the messaging device to differentiate between primary user devices and secondary user devices, and to selectively provide messages for delivery to primary user devices in a timely manner. Furthermore, implementations described herein may assist a messaging device in determining whether to deliver a message associated with a telephone number when there are multiple user devices that share the telephone number. Implementations described herein may reduce instances of failed message delivery, and may conserve network resources by reducing network traffic associated with failed delivery of messages to secondary user devices not able to receive the messages.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A messaging device, comprising:
   one or more memories; and
   one or more processors, communicatively coupled to the one or more memories, to:
      receive a first indication that a shared telephone number is associated with multiple user devices of a user,
         the first indication being stored in a data structure of the messaging device;
      receive a second indication that delivery of a message, to a destination identified by the shared telephone number associated with the multiple user devices, has failed;
      subscribe to receive at least one home subscriber server (HSS) registration notification from at least one HSS;
      subscribe to receive at least one call session control function (CSCF) registration notification from a message delivery device associated with delivering the message to the destination identified by the shared telephone number,
         the at least one CSCF registration notification being received from the message delivery device associated with the delivery of the failed message;
      receive, from the message delivery device and based on subscribing to receive the at least one CSCF registration notification, a unique identifier corresponding to a user device, of the multiple user devices, registered with the message delivery device,
         the unique identifier being an identifier other than the shared telephone number;
      determine whether the unique identifier indicates that the user device is able to receive the message,
         the unique identifier including a first device identifier type, that indicates that the user device is able to receive the message, or a second device identifier type that indicates that the user device is unable to receive the message,
            the first device identifier type being different from the second device identifier type, and
            an identifier type being determined by searching the unique identifier for a pattern;
      selectively provide the message to the message delivery device based on determining whether the unique identifier includes the first device identifier type or the second device identifier type,
         the message being provided to the message delivery device when the unique identifier includes the first device identifier type, and
         the message not being provided to the message delivery device when the unique identifier includes the second device identifier type;
      receive a third indication that the message was successfully delivered to the user device based on the message being provided to the message delivery device; and
      provide, to the message delivery device and the at least one HSS, a request to unsubscribe from receiving registration notifications associated with the shared telephone number based on receiving the third indication that the message was successfully delivered to the user device.

2. The messaging device of claim 1,
   where the one or more processors, when subscribing to receive the at least one CSCF registration notification, are further to:
      subscribe to receive the at least one CSCF registration notification based on receiving the first indication that indicates that the shared telephone number is associated with the multiple user devices.

3. The messaging device of claim 1, where the unique identifier is a session initiation protocol instance identifier associated with the user device.

4. The messaging device of claim 1, where the message is a short message service (SMS) message or a multimedia messaging service (MMS) message.

5. The messaging device of claim 1, where the shared telephone number is a mobile directory number (MDN).

6. A non-transitory computer-readable medium storing instructions, the instructions comprising:
   one or more instructions that, when executed by one or more processors, cause the one or more processors to:
      receive a first indication that a shared telephone number is associated with multiple user devices of a user,
         the first indication being stored in a data structure of the one or more processors;
      receive a second indication that delivery of a message, to a destination identified by the shared telephone number, has failed;
      subscribe to receive at least one home subscriber server (HSS) registration notification from at least one HSS;
      subscribe to receive at least one call session control function (CSCF) registration notification from a device associated with delivering the message to the destination identified by the shared telephone number,
         the at least one CSCF registration notification being received from the device associated with the delivery of the failed message;
      receive a unique identifier from the device associated with delivering the message,
         the unique identifier corresponding to a user device of the multiple user devices, and
         the unique identifier being different from the shared telephone number;
      determine whether the unique identifier indicates that the user device is able to receive the message,
         the unique identifier including a first device identifier type, that indicates that the user device is able to receive the message, or a second device identifier type that indicates that the user device is unable to receive the message,
            the first device identifier type being different from the second device identifier type, an identifier type being determined by searching the unique identifier for a pattern;
selectively provide the message to the device based on determining whether the unique identifier includes the first device identifier type or the second device identifier type,
the message being provided to the device for delivery to the user device when the unique identifier includes the first device identifier type, and
the message not being provided to the device when the unique identifier includes the second device identifier type;
receive a third indication that the message was successfully delivered to the user device based on the message being provided to the device; and
provide, to the device and the at least one HSS, a request to unsubscribe from receiving registration notifications associated with the shared telephone number based on receiving the third indication that the message was successfully delivered to the user device.

7. The non-transitory computer-readable medium of claim 6, where the one or more instructions, that cause the one or more processors to determine whether the unique identifier includes the first device identifier type or the second device identifier type, further cause the one or more processors to:
determine whether the unique identifier includes a first string, that indicates that the user device is able to receive the message, or a second string that indicates that the user device is unable to receive the message, the first string being different from the second string; and
where the one or more instructions, that cause the one or more processors to selectively provide the message to the device, further cause the one or more processors to:
selectively provide the message to the device based on determining whether the unique identifier includes the first string or the second string,
the message being provided to the device for delivery to the user device when the unique identifier includes the first string, and
the message not being provided to the device when the unique identifier includes the second string.

8. The non-transitory computer-readable medium of claim 6, where the first device identifier type is an international mobile station equipment identity (IMEI).

9. The non-transitory computer-readable medium of claim 6, where the second device identifier type is a media access control (MAC) address.

10. The non-transitory computer-readable medium of claim 6,
where the one or more instructions, that cause the one or more processors to selectively provide the message to the device, further cause the one or more processors to:
selectively provide the message to the device based on searching the unique identifier for the pattern,
the message being provided to the device for delivery to the user device when the unique identifier includes the pattern, and
the message not being provided to the device when the unique identifier does not include the pattern.

11. The non-transitory computer-readable medium of claim 6, where the message includes a text message.

12. A method, comprising:
receiving, by a first device, a first indication that a shared telephone number is associated with multiple user devices of a user,
the first indication being stored in a data structure of the first device;
receiving, by the first device, a second indication that delivery of a message, to a destination identified by the shared telephone number, has failed;
subscribing, by the first device, to receive at least one home subscriber server (HSS) registration notification from at least one HSS;
subscribing, by the first device, to receive at least one call session control function (CSCF) registration notification from a device associated with delivering the message to the destination identified by the shared telephone number,
the at least one CSCF registration notification being received from the device associated with the delivery of the message that has failed;
receiving, by the first device and based on subscribing to receive the at least one CSCF registration notification, a unique identifier from a second device associated with delivering the message to the destination identified by the shared telephone number,
the unique identifier corresponding to a user device of the multiple user devices,
the unique identifier being received based on registration of the user device with the second device,
the unique identifier being different from the shared telephone number, and
the unique identifier including a first device identifier type that indicates that the user device is able to receive the message, or a second device identifier type that indicates that the user device is unable to receive the message,
the first device identifier type being different from the second device identifier type, and
an identifier type being determined by searching the unique identifier for a pattern;
selectively providing, by the first device, the message to the second device based on whether the unique identifier includes the first device identifier type or the second device identifier type,
the message being provided to the second device for delivery to the user device when the unique identifier includes the first device identifier type, and
the message not being provided to the second device when the unique identifier includes the second device identifier type;
receiving, by the first device, a third indication that the message was successfully delivered to the user device based on the message being provided to the second device; and
providing, by the first device, to the second device and the at least one HSS, a request to unsubscribe from receiving registration notifications associated with the shared telephone number based on receiving the third indication that the message was successfully delivered to the user device.

13. The method of claim 12, where the second device is a call session control function (CSCF) device.

14. The method of claim 12,
where the unique identifier is included in the CSCF registration notification.

15. The method of claim 12, further comprising:
determining whether the unique identifier includes a string of characters that indicates that the user device is able to receive the message; and
where selectively providing the message to the second device further comprises:

selectively providing the message to the second device based on determining whether the unique identifier includes the string of characters,
the message being provided to the second device for delivery to the user device when the unique identifier includes the string of characters, and
the message not being provided to the second device when the unique identifier does not include the string of characters.

16. The messaging device of claim 1, where the unique identifier includes at least one of:
a uniform resource locator (URL) associated with the user device, or
a uniform resource name (URN) associated with the user device.

17. The non-transitory computer-readable medium of claim 6, where the unique identifier includes at least one of:

a session initiation protocol (SIP) instance associated with the user device,
a uniform resource locator (URL) associated with the user device, or
a uniform resource name (URN) associated with the user device.

18. The messaging device of claim 1, where the subscription to receive the at least one CSCF registration notification is associated with a threshold period of time.

19. The non-transitory computer-readable medium of claim 6, where the subscription to receive the at least one CSCF registration notification is associated with a threshold period of time.

20. The method of claim 12, where the subscription to receive the at least one CSCF registration notification is associated with a threshold period of time.

* * * * *